United States Patent [19]

Chen

[11] Patent Number: 5,676,000
[45] Date of Patent: Oct. 14, 1997

[54] STEERING WHEEL LOCK WITH ALARM

[76] Inventor: Shih-Yu Chen, No. 3, Alley 11, Lane 15, Yung-Fu Street, Shin-Shih, Tainan Hsien,, Taiwan

[21] Appl. No.: 640,072

[22] Filed: Apr. 30, 1996

[51] Int. Cl.[6] ............................ B06R 25/10; B06R 25/02
[52] U.S. Cl. ...................... 70/209; 307/10.2; 70/DIG. 49; 70/211; 70/226
[58] Field of Search ................................ 70/209, 211, 212, 70/226, 225, 237, 238, DIG. 55, DIG. 49; 307/10.1, 10.2, 10.3

[56] References Cited

U.S. PATENT DOCUMENTS

| | | | |
|---|---|---|---|
| 1,668,147 | 5/1928 | Hersey | 70/237 |
| 3,782,862 | 1/1974 | Cammi | 70/237 |
| 5,055,823 | 10/1991 | Fuller | 70/209 |
| 5,128,649 | 7/1992 | Elmer | 70/237 |
| 5,258,741 | 11/1993 | Fuller | 340/426 |
| 5,398,017 | 3/1995 | Chen | 307/10.2 |
| 5,404,735 | 4/1995 | Hsieh | 70/DIG. 49 |
| 5,440,908 | 8/1995 | Lin | 70/209 |
| 5,454,242 | 10/1995 | Su | 70/209 |
| 5,457,972 | 10/1995 | Lo | 70/209 |
| 5,469,135 | 11/1995 | Solow | 70/209 |

*Primary Examiner*—Darnell M. Boucher
*Attorney, Agent, or Firm*—Morton J. Rosenberg; David L Klein

[57] ABSTRACT

A lock-set for an automobile consists of a padlock body, a fixing rod and a holder. The padlock body includes a turnable cramp, a cylinder linking with a pushing bar and engaging with the cramp. One end of the pushing bar comprises an elastic element engaging with a switch within the fixing rod. The switch connects to an alarm circuit board in the holder. When the padlock body is secured on a steering wheel by the cramp, the elastic element of the pushing bar urging the switch inwardly thus activates the alarm system.

5 Claims, 7 Drawing Sheets

STEERING WHEEL LOCK WITH ALARM

BACKGROUND OF THE INVENTION

1. Field of the Invention the present invention relates to a lock-set for automobile, and more particularly to a steering wheel lock-set that has alarm function.

2. Background of Prior Art Steering Lock

In accordance with the present marketing, the anti-theft device for the automobile can be classified into two catagories: one of which is a rigid structure lock-set which confines the movement of the steering wheel or the pedals, the other of which is an alarm system which produces loud and noisy sound while the automobile senses an illegal operation.

However, the first prior device may be pried by force to break and the second prior device may be disconnected by various illegal methods.

SUMMARY OF THE INVENTION

It is the primary object of the present invention to provide a steering wheel lock-set that combines a rigid structure lock-set and an alarm system, in which the alarm will be triggered when sensing the lock-set is unlocked illegally to warn both the owner of the vehicle and the burglar.

It is another object of the present invention to provide a single rod steering wheel lock-set in that an alarm housing is built integrally on one end thereof to prevent the lock-set from being pried illegally.

It is a further object of the present invention to provide a steering wheel lock-set for automobile which is easy to operate.

DETAILED DESCRIPTION OF THE PREFERRED EMBODIMENT

Figure 1:
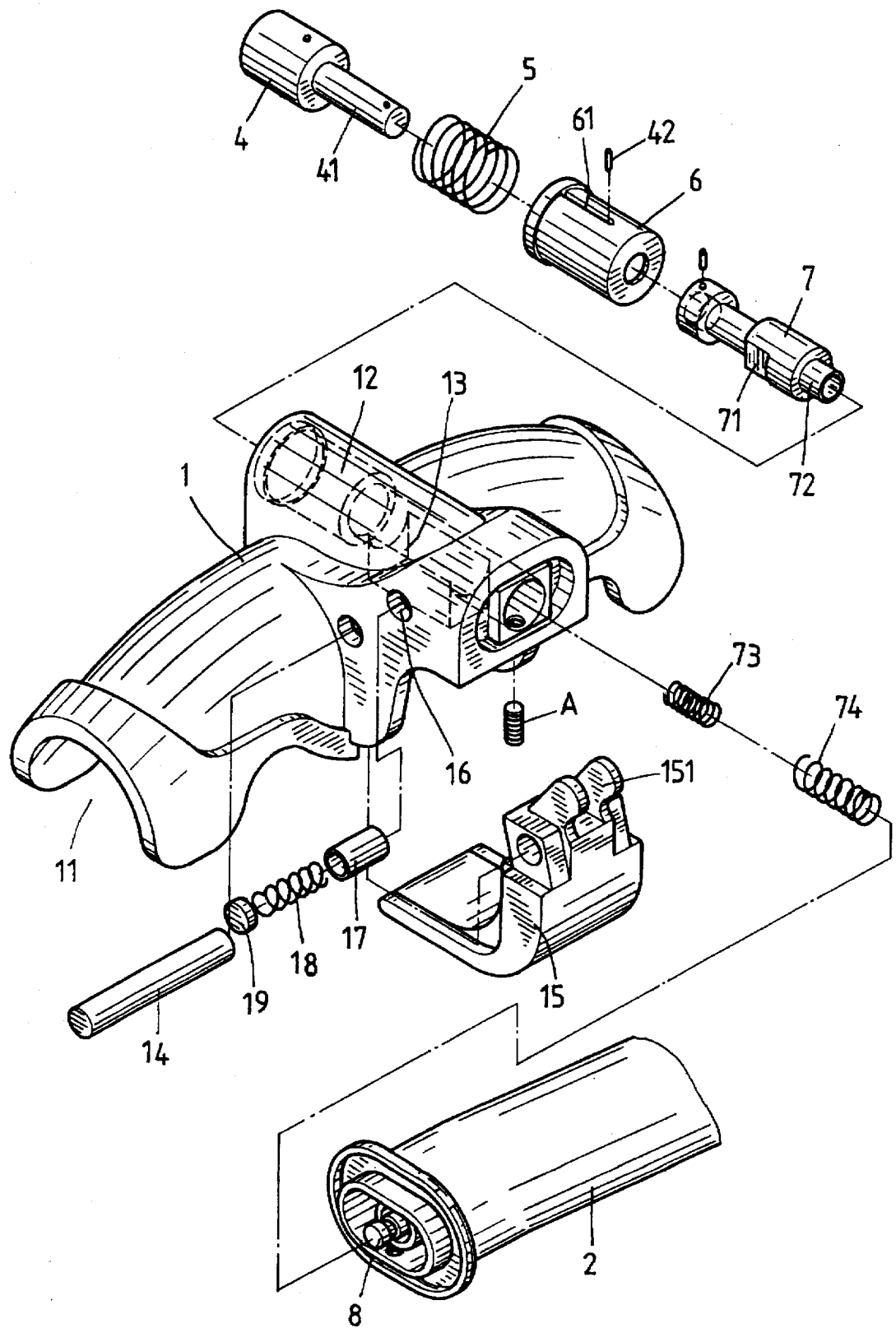
FIG. 1 is an exploded view showing a portion 1 of a lock-set of the present invention.
Figure 2:
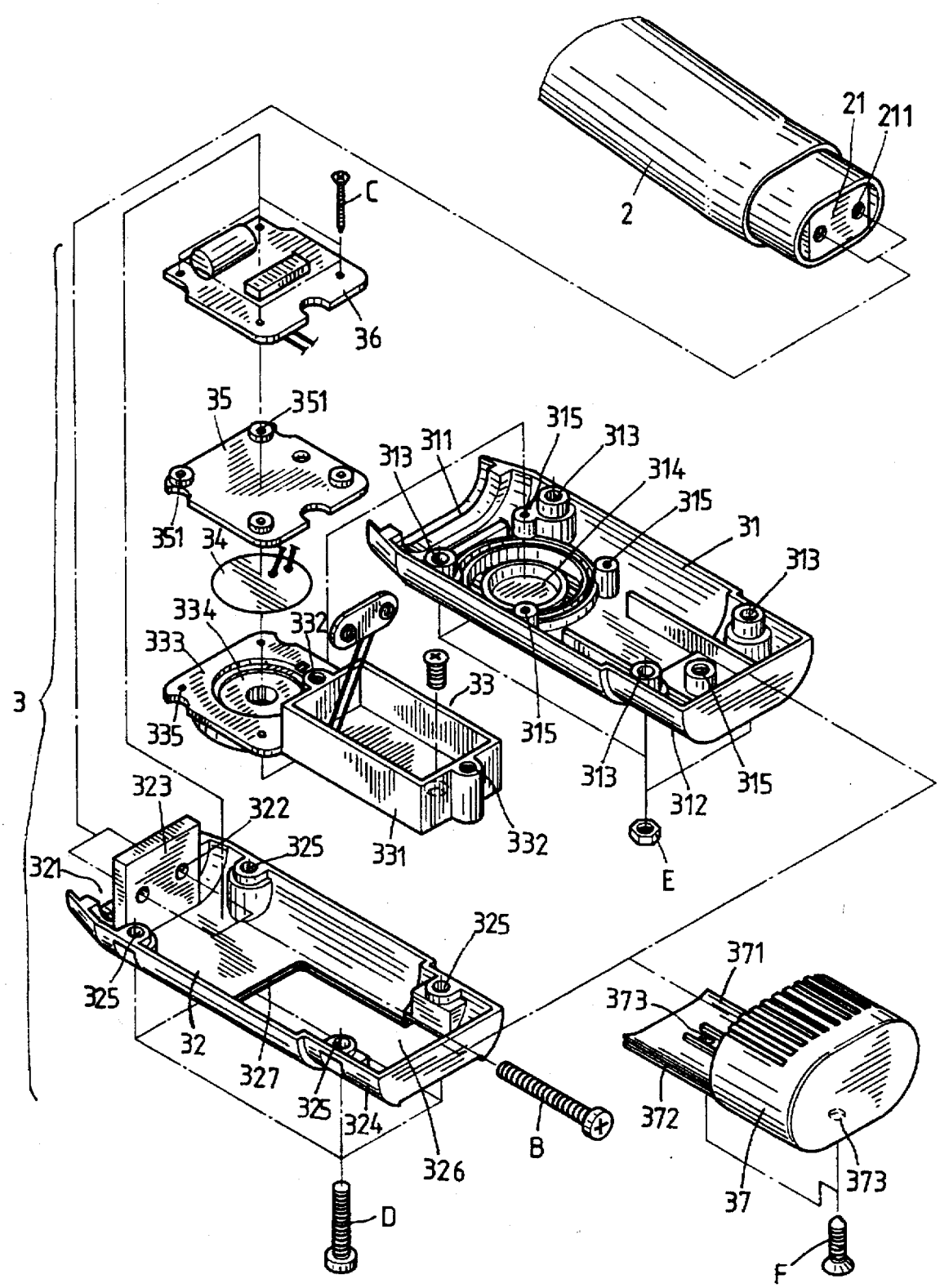
FIG. 2 is an exploded view showing a portion 2 of the lock-set of the present invention.

Referring to FIGS. 1 and 2, the present invention comprises a padlock body 1, a fixing rod 2 and a holder 3 housing an alarm system therein.

The padlock body 1 has a curved cavity portion 11 corresponding to the shape of a steering wheel, a cylinder housing 12 intersecting the curved cavity portion 11, a slotted hole 13 communicating with the cylinder housing 12 and the curved cavity portion 11, and a dowel 14 pivoting a turnable clamp 15 on the side opening of the curved cavity portion 11. The cylinder housing 12 is adapted to accommodate a cylinder 4 which has a bolt 41 extending through a spring 5 and into a barrel 6. The cylinder 4 further comprises a pin 42 extending into a corresponding slot 61 of a sleeve barrel 6 with the head end of the barrel 6 extending through the sleeve barrel 6 and engaging with the pushing bar 7. The middle portion of the pushing bar 7 has a reduced diameter which secures a plate 151 of the clamp 15, thus when pressing the cylinder 4, the pushing bar 7 and the plate 151 are linked to slide causing the clamp 15 in a locked state. The other end of the pushing bar 7 opposing the cylinder 4 has a recess 71 adapted to receive a chock 19, a spring 18 and a foxtail 17 therein through an aperture 16. The foxtail 17 is urged by the spring outwardly which blocks the pushing bar 7 from sliding backward.

The pushing bar 7 has a blind hole 72 at one end adapted to receive a small spring 73 and a large spring 74 therein with the large spring 74 urging the pushing bar 7 to return to its original position.

The fixing rigid rod 2 has a flexed portion with one end inserted through the cylinder house 12 of the padlock body 1 and secured by a bolt A. A switch 8 is secured at the end of the fixing rod 2 engaging with the small spring 73 and having connected to an alarm system. The other end of the rod 2 comprises a fixed strip 21 having a pair of threaded holes 211 for securing the holder 3 thereat.

The holder 3 is composed of an upper and a lower shells 31 and 32 to receive a battery compartment 33, a vibrating plate 34, a fixture 35 and an electric circuit board 36 therein, and joining with a cartridge 37. The upper shell 31 has an open slot 311 corresponding to one half of the shape of the fixing rod 2, a step portion 312 at the other end of the shell 31, a pair of hole bases 313 being formed at inner sides close to the slot 311 and the step portion 312, respectively, and an engraved slot recess 314 at the center portion. The lower shell 32 includes also an open slot 321 corresponding to the other one half shape of the fixing rod 2, a block 323 at one end having two through holes 322 for securing the fixed strip 21 with a bolt B thereat. The other end of the lower shell 32 has a step portion 324, hole bases 325 corresponding both in shape and quantity to the hole bases 313, a rectangular opening 326 at inner side close to the step portion 324 and a rim 327 extending along the edge of the opening 326.

The battery compartment 33 includes a frame 331 having two screw bases 332 at respective sides of the center portion, a seat plate 333 extending outwardly from one end having a recess 334 adapted to receive the vibrating plate 34 therein. A plurality of holes 335 are formed along the seat plate 333 for securing holes bases 351 of the fixture 35 which then secures the alarm circuit board 36 thereon.

The cartridge 37 is a hollow shell corresponding to the holder 3 having a cover piece 371 with a fillister 372 along the edge and two holes 373 on the same side of the cover piece 371.

Figure 3:
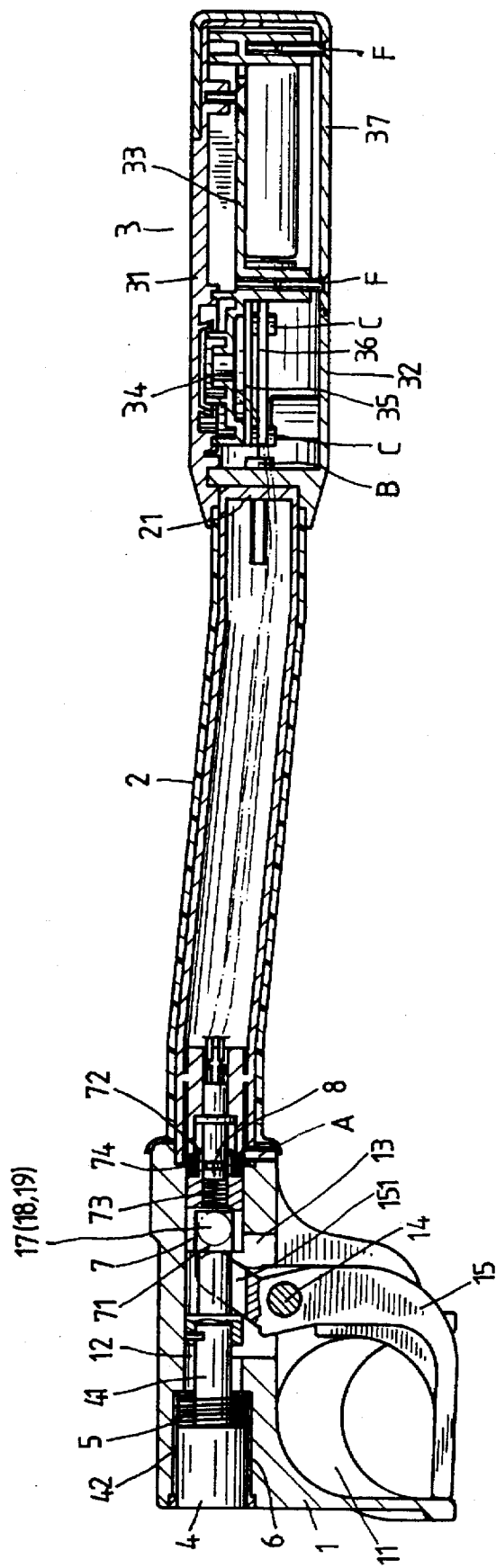
FIG. 3 is a cross-section view of the present invention.

To assemble the present invention, referring to FIG. 3, except that the above-mentioned mounting, the battery compartment 33, the vibrating plate 34, the fixture 35 and the alarm circuit board 36 are all secured on the screw bases 315 in the upper shell 31 by means of bolts C, and is secured to the fixing rod 2 with the lower shell 32 by inserting screws D through the corresponding holes 313, 325 and fastened by nuts E at the other end.

Figure 4:
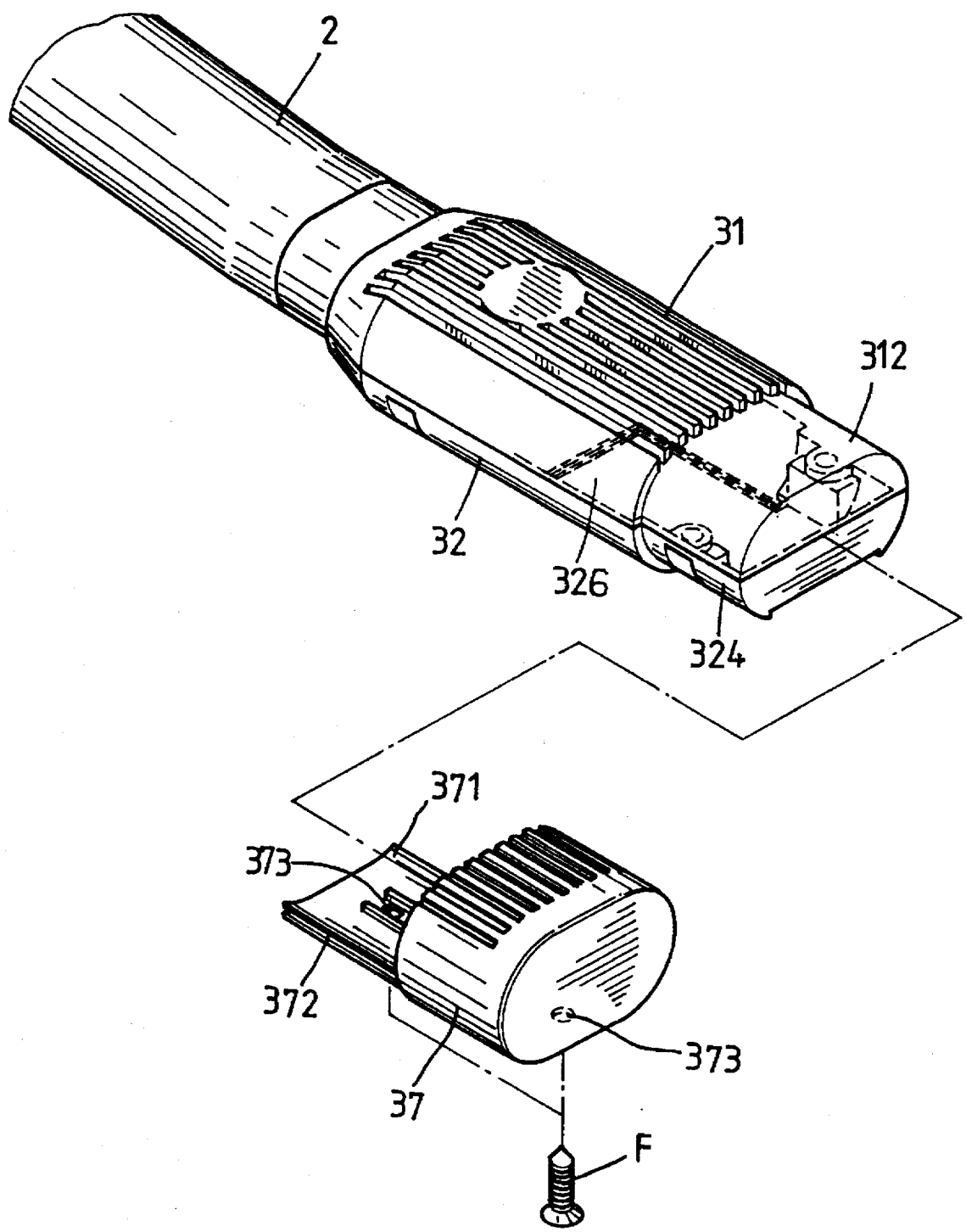
FIG. 4 is a perspective projection view showing a portion of the present invention.

The holder 3, upon assembled, as shown in FIG. 4, is composed of an opening 326 at the lower shell 32 for the convenience of replacing battery.

The cover 371 of the cartridge 37 can be slid along the fillister 372 to close the opening 326. The shell body of the cartridge 37 covers the step portions 312 and 324 including the hole bases 313, 325 and fasteners D and E. Then two screws F will be adapted to fasten the cartridge 37 and the battery compartment 33 (as shown in FIG. 3.)

When the present invention is applied onto a steering wheel, the lower shell 32 of the holder 3 linking with the fixing rod 2 is engaged with the side wall of the dashboard which prevents from unscrew the fasteners illegally.

Figure 5:
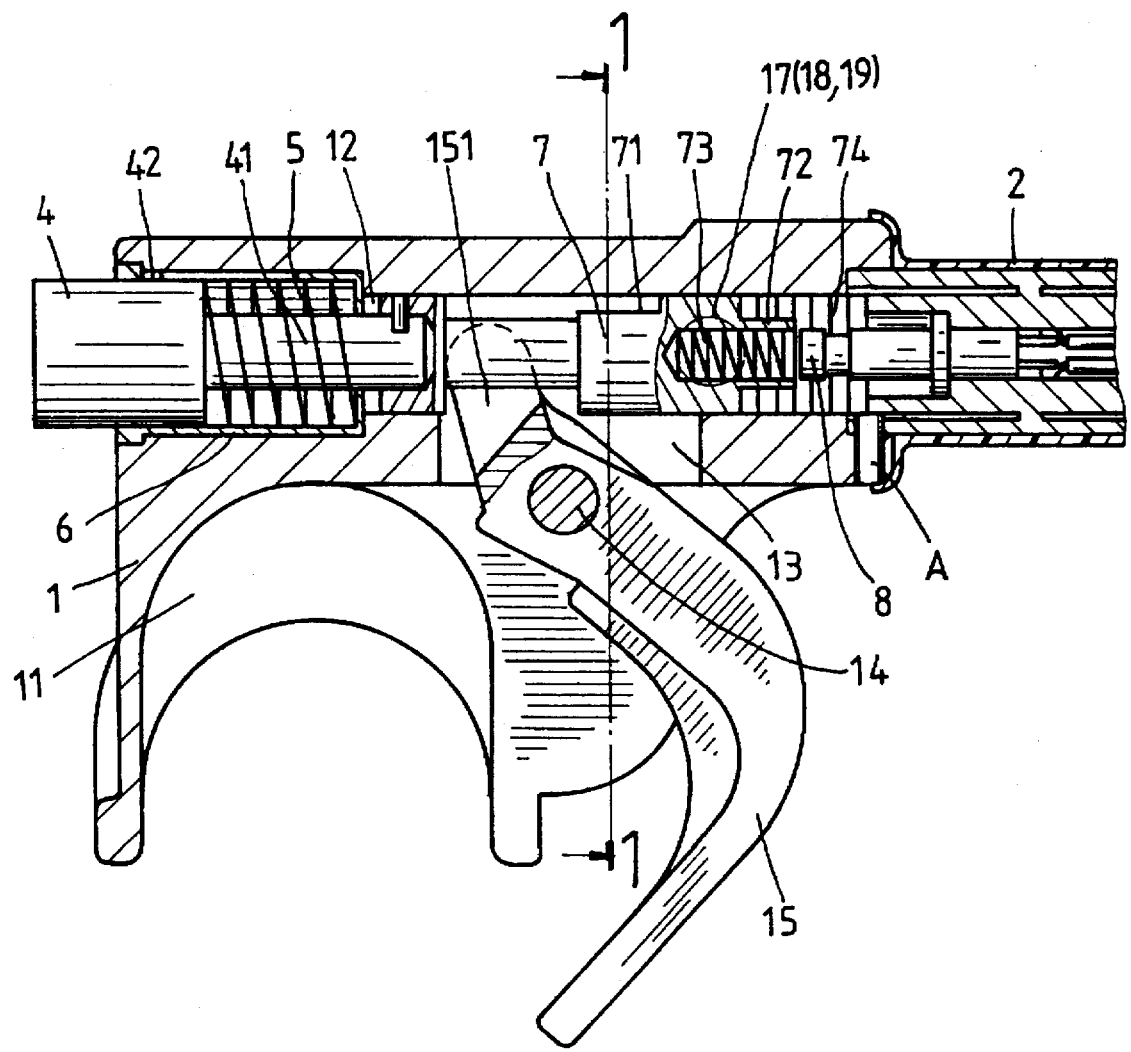
FIG. 5 is a side elevation, partly in cross section, showing the lock-set in an unlocked state.

When the clamp 15 and the cylinder 4 are set free, as shown in FIG. 5, the pushing bar 7 is urged by the large spring 74 and the small spring 73 is free from the switch 8 which causes the alarm system deactivated.

Figure 6:
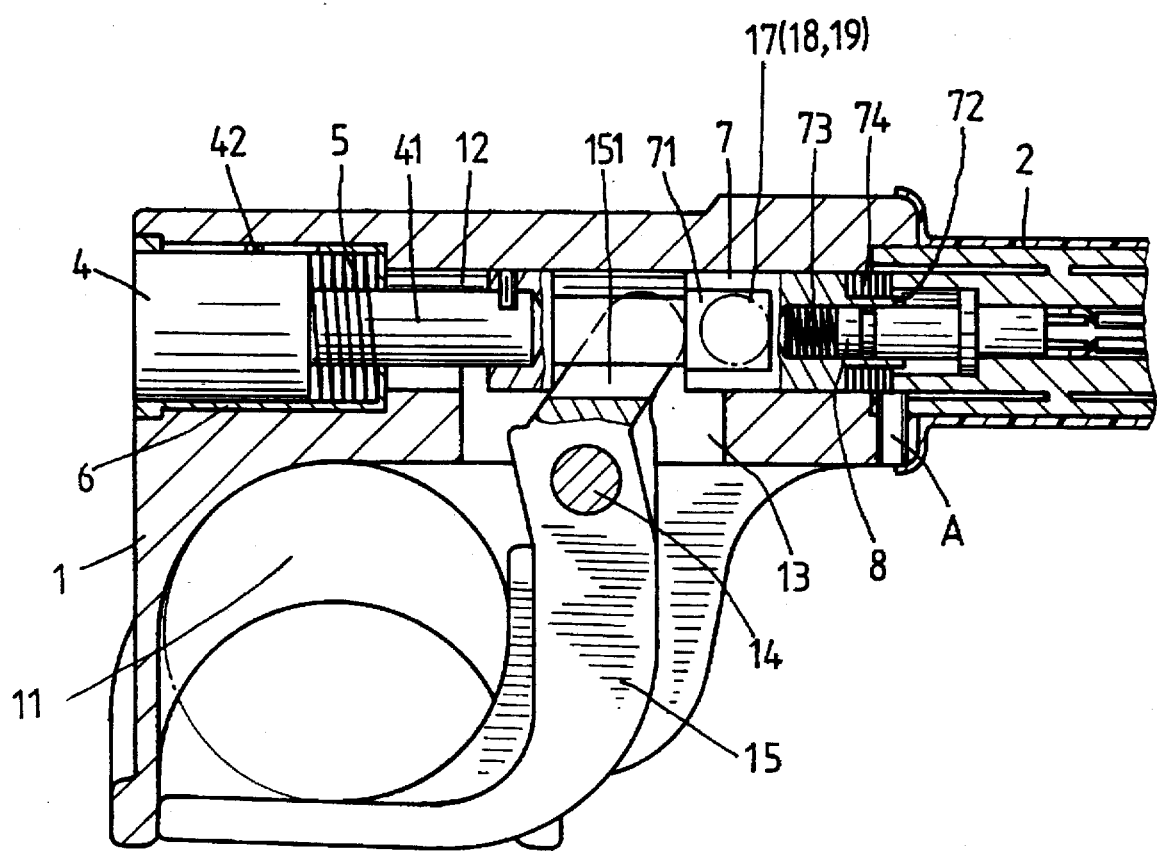
FIG. 6 is a view similar to FIG. 5 but showing a locked state.

When the cylinder 4 is pressed and the clamp 15 holds the steering wheel, as shown in FIG. 6, the pushing bar 7 is linked to slide towards the switch 8 which links the small spring 73 to depress the switch 8, thus activates the alarm system.

Figure 7:
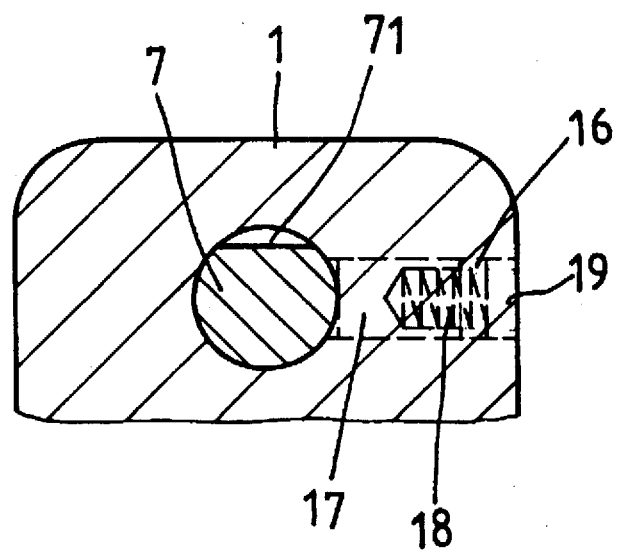
FIG. 7 is a cross section view taken along line 1—1 of FIG. 5.

Further, to unlock the present invention, the cylinder 4 is operated by a legal key to pivot the pushing bar 7, as shown in FIG. 7, which depresses the foxtail 17 to slide outwardly from the the recess 71 and leading the smooth surface of the pushing bar 7 return to its original position.

I claim:

1. An antitheft lock assembly for a steering member of a vehicle comprising:

(a) a padlock body extending in a longitudinal direction adapted to engage said steering member of said vehicle;

(b) a clamp member pivotally coupled to said padlock body for securing said engagement of said padlock body with said steering member;

(c) a fixing rod assembly coupled to said padlock body extending transversely therefrom, said fixing rod assembly including an alarm unit having coupled thereto switch means for setting said alarm unit in mutually exclusive activated and deactivated states, said alarm unit being adapted in said activated state thereof to transmit an alarm signal upon sensing a predetermined disturbance parameter; and, (d) key-operated actuation means coupled to said clamp member, said actuation means for actuating said switch means and pivotally displacing said clamp member relative to said padlock body between first and second positions substantially simultaneously, said actuation means including means for releasably locking said clamp member at said first position thereof, said actuation means resiliently biasing said switch means to maintain said alarm unit in said activated state when said clamp member is in said first position.

2. The antitheft lock assembly as recited in claim 1 wherein said alarm unit includes a vibrating plate and an alarm control circuit board coupled thereto for sensing a mechanical disturbance of said lock assembly and responsively transmitting an alarm signal.

3. The antitheft lock assembly as recited in claim 2 wherein said fixing rod assembly includes a holder portion for housing said alarm unit, said holder portion including:

(a) a first shell member having a flanged step portion formed thereon;

(b) a second shell member joined to said first shell member, said second shell member having formed thereon a flanged step portion and an access through opening;

(c) a battery compartment disposed within said upper and lower shell members adapted to receive a battery for supplying power to said alarm unit, said battery compartment being accessible for insert and removal of said battery through said second shell member access through opening;

(d) a cartridge member coupled to at least one of said first and second shell members to be displaceable between open and closed positions, said cartridge member being adapted to engage said step portions of said first and second shell members and having a cover piece extending therefrom, said cover piece being adapted to substantially cover said second shell member access through opening when said cartridge member is in said closed position; and, (e) securing means coupled to said cartridge member to secure said cartridge member in said closed position.

4. The antitheft lock assembly as recited in claim 1 wherein said key-operated actuation means includes an axially extending pushing bar, said pushing bar terminating axially in an end portion, said end portion including an axially extending tubular section having coaxially disposed inner and outer wall surfaces, said inner wall surface defining a blind hole chamber.

5. The antitheft lock assembly as recited in claim 4 wherein said key-operated actuation means includes first and second spring members for resiliently coupling said pushing bar end portion to said alarm unit switch means, said first spring member being inserted into said blind hole chamber in substantially coaxial manner, said second spring member engaging said outer wall surface of said tubular section in substantially coaxial manner.

* * * * *